(12) United States Patent
Freund et al.

(10) Patent No.: US 7,085,442 B2
(45) Date of Patent: Aug. 1, 2006

(54) OPTOELECTRONIC DEVICE, METHOD OF MANUFACTURING THEREOF, AND SYSTEM INCLUDING THE SAME

(75) Inventors: Joseph M. Freund, Fogelsville, PA (US); John M. Geary, Macungie, PA (US)

(73) Assignee: TriQuint Technology Holding Co., Hillsboro, OR (US)

( * ) Notice: Subject to any disclaimer, the term of this patent is extended or adjusted under 35 U.S.C. 154(b) by 249 days.

(21) Appl. No.: 10/731,253

(22) Filed: Dec. 9, 2003

(65) Prior Publication Data
US 2004/0114207 A1    Jun. 17, 2004

Related U.S. Application Data

(60) Provisional application No. 60/431,944, filed on Dec. 9, 2002.

(51) Int. Cl.
*G02B 6/12* (2006.01)

(52) U.S. Cl. ......................................................... 385/14
(58) Field of Classification Search .................... 385/14
See application file for complete search history.

(56) References Cited

U.S. PATENT DOCUMENTS 6,483,954 B1 * 11/2002 Koehl et al. .................... 385/2

* cited by examiner

*Primary Examiner*—Jennifer Doan
(74) *Attorney, Agent, or Firm*—Hitt Gaines P.C.

(57) ABSTRACT

The present invention provides an optoelectronic device, a method of manufacturing thereof, and an optical communications system including the same. The optoelectronic device includes an optical substrate coupled to a submount and including an optical device, and a signal and a ground conductor coupled to the submount, wherein the signal and ground conductors have a direction of signal propagation associated therewith, and wherein related transitions of the signal and ground conductors between the submount and the optical substrate are separated along the direction by a predetermined distance.

10 Claims, 7 Drawing Sheets

FIG. 11

OPTOELECTRONIC DEVICE, METHOD OF MANUFACTURING THEREOF, AND SYSTEM INCLUDING THE SAME

CROSS-REFERENCE TO PROVISIONAL APPLICATION

This application claims the benefit of U.S. Provisional Application No. 60/431,944 entitled "OPTOELECTRONIC DEVICE, METHOD OF MANUFACTURING THEREOF, AND SYSTEM INCLUDING THE SAME," to Joseph M. Freund, et al., filed on Dec. 9, 2002, which is commonly assigned with the present invention and incorporated herein by reference as if reproduced herein in its entirety.

TECHNICAL FIELD OF THE INVENTION

The present invention is directed, in general, to an optical device and, more specifically, to an optoelectronic device having signal and ground conductors having a direction of propagation associated therewith and having related transitions from a submount to an optical substrate separated along the direction, a method of manufacture therefor, and a system including the same.

BACKGROUND OF THE INVENTION

Electro-absorption modulators and other modulators have long been used in the processing of optical signals, especially in the telecommunications industry. Conventionally, modulators are embodied in optoelectronic devices that incorporate an optical waveguide. The optical waveguide may be provided in a modulator chip that conventionally includes an optical substrate having a modulation region between two conductive regions. The optical waveguide guides light between the two conductive regions so that a significant amount of optical energy passes through the modulation region. The modulation region has the property that its transparency can be varied by the application of an electric field. Since the modulation region is located between the two conductive regions, a voltage applied between the two conductive regions subjects the modulation region to an electric field. Thus, the applied voltage can control the amount of light passing through the modulator.

In operation of a modulator, data bits may be imposed on the light passing through the optical waveguide of the modulator chip by applying a voltage that has either of two values. One value makes the modulation region more transparent, and the other value makes the modulation region more opaque. Light exiting the modulator chip when the modulation region is more transparent is at a higher optical power than the light exiting the modulator chip when the modulation region is more opaque. The ratio of the optical power of the light exiting the modulator chip in these two states, for given values of voltage, is called the extinction ratio.

The maximum rate at which bits can be imposed on the light is called the bit rate. At high bit rates, the voltage applied to the modulator chip will be varying very rapidly, so the performance of the modulator at high frequencies becomes important. Both high extinction ratio and high bit rate are very desirable modulator properties.

Conventionally, a modulator is driven by connecting an input transmission line (having a characteristic impedance "Z0") to the modulator, with each of the two conductors of the input transmission line connected to a respective conductive region of the modulator. The modulator is shunted by a load resistor (having a resistance "Rload"=Z0) at the point where the input transmission line connects to the modulator. Unfortunately, this is a non-ideal approximation to the desired matched load situation, because it is a combination of the capacitance of the modulator ("Cmod") in parallel with the load resistor that terminates the input transmission line, rather than the load resistor alone. As the modulator is operated at higher frequencies, the impedance of this parallel combination will decrease so that the modulator behaves increasingly like a short, because the impedance of capacitance is inversely proportional to frequency. Consequently, at high frequencies, the impedance at the end of the input transmission line will increasingly differ from the characteristic impedance of the input transmission line. This impedance mismatch may result in increased reflection back onto the input transmission line, and decreased signal at the modulator. Both of these effects limit performance of the modulator at high frequency and, accordingly, limit bit rate.

One might attempt to alleviate these limitations on high frequency performance by making the modulator shorter along the direction of the optical waveguide. The parasitic capacitance of the modulator would then be reduced, approximately in proportion to the decrease in length. While this would improve the high frequency performance, it would also decrease the extinction ratio, which is approximately proportional to modulator length. Thus, there is an unfortunate trade-off between these two desirable aspects of modulator performance.

Accordingly, what is needed in the art is an optoelectronic device that does not experience the drawbacks associated with the prior art devices.

SUMMARY OF THE INVENTION

To address the above-discussed deficiencies of the prior art, the present invention provides an optoelectronic device that includes an optical substrate, coupled to a submount and including an optical device, and a signal and a ground conductor coupled to the submount, wherein the signal and ground conductors have a direction of signal propagation associated therewith, and wherein related transitions of the signal and ground conductors between the submount and the optical substrate are separated along the direction by a predetermined distance.

The foregoing has outlined an embodiment of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

The invention is best understood from the following detailed description when read with the accompanying FIGUREs. It is emphasized that, in accordance with the standard practice in the industry, various features are not drawn to scale. In fact, the dimensions of the various features may be arbitrarily increased or reduced for clarity of discussion.

Reference is now made to the following descriptions taken in conjunction with the accompanying drawings, in which.

DETAILED DESCRIPTION

Figure 1:
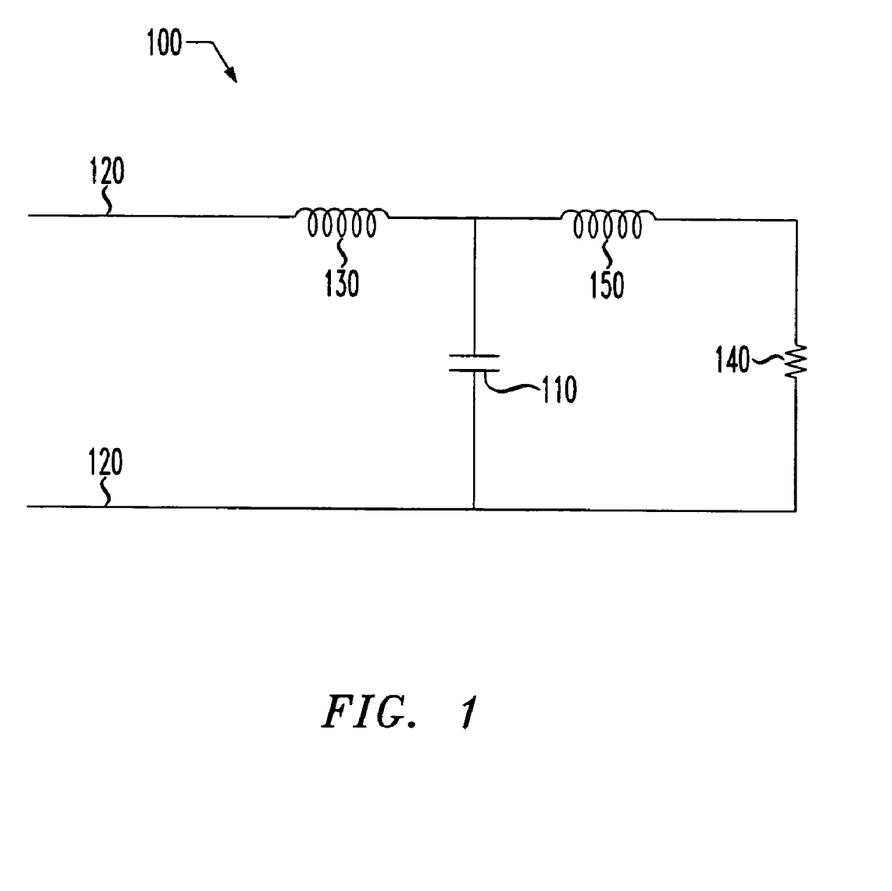
FIG. 1 illustrates an electrical circuit approximating one embodiment of an optoelectronic device constructed according to the principles of the present invention.

Referring initially to FIG. 1, illustrated is an electrical circuit 100 approximating one embodiment of an optoelectronic device constructed according to the principles of the present invention. The electrical circuit 100 illustrates the principles by which the above-described problems caused by the capacitance of the modulator may be diminished by adding inductive elements. In the illustrative embodiment shown, the capacitor 110 models a modulator (see FIG. 4) having a capacitance "Cmod". In contrast to the above-described conventional optoelectronic devices, wherein an input transmission line is connected directly to a modulator, an input transmission line 120 may be connected to an inductive element 130, having an inductance "L1", which in turn connects to the modulator/capacitor 110. Also in contrast to conventional optoelectronic devices, wherein a load resistor is connected directly to a modulator, a load resistor 140 may be connected to an inductive element 150, having an inductance "L2", which is in turn connected to the modulator/capacitor 110. Accordingly, a pulse (not shown) propagating along the input transmission line 120 will, thus, encounter the series inductance L1, then the shunt capacitance Cmod, then another series inductance L2, and finally the shunt resistor Rload. The alternation of shunt capacitance and series inductance in FIG. 1 bears a resemblance to the commonly known lumped-element transmission line approximation, the significance of which is discussed below.

Figure 2:
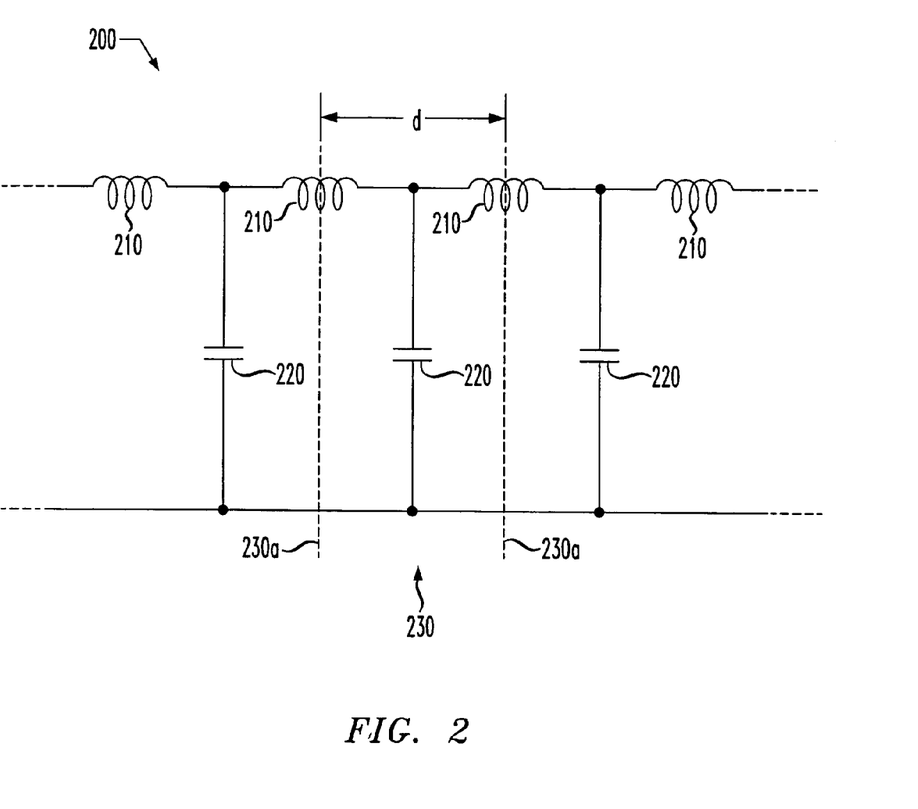
FIG. 2 illustrates an electrical circuit representing a theoretical lumped-element transmission line approximation.

Turning now to FIG. 2, illustrated is an electrical circuit representing a theoretical lumped-element transmission line approximation 200. Note that FIG. 2 is provided to facilitate a discussion of the advantages of alternating shunt capacitance and series inductance. In the lumped-element approximation 200, the distributed inductance per length "L*" of a normal transmission line is replaced by a sequence of lumped inductors 210 each having an inductance value "L" and separated by a distance "d", and the distributed capacitance per length "C*" is replaced by a sequence of lumped capacitors 220 each having a capacitance value "C" and also separated by the distance d. If the distance d is a sufficiently short distance, then the sequence of lumped elements 210 and 220 will effectively act as a continuously distributed property. Accordingly, an effective inductance per length "C*" and an effective capacitance per length "L*" may generally be given by:

$$L^* = L/d \quad (1)$$

and $$C^* = C/d. \quad (2)$$

As in a normal transmission line, the characteristic impedance and the propagation velocity may be computed in terms of the distributed inductance per length and the distributed capacitance per length as follows:

$$Z = \mathrm{SQRT}(L^*/C^*) \quad (3)$$

and $$V = \mathrm{SQRT}(1/(L^* C^*)) \quad (4)$$

The lumped-element approximation 200 may be considered to be assembled out of a sequence of identical sections 230. One such section 230 is indicated between dotted lines 230a. It consists of a series inductor of value L/2, a shunt capacitor of value Cmod, and a second series inductor of value L/2. Returning to FIG. 1, the arrangement of L1, C and L2 is similar to L/2, Cmod and L/2 shown in FIG. 2. In other words, the arrangement of elements in FIG. 1 may be understood as a single section of a lumped-element transmission line. The inductance per length L*eff and capacitance per length C*eff, for this line section of FIG. 1 may be given by:

$$L^* \mathit{eff} = (L1 + L2)/d \quad (5)$$

and $$C^* \mathit{eff} = C\mathrm{mod}/d. \quad (6)$$

In this case, the expressions for characteristic impedance "Zeff" and propagation velocity "Veff" will then be:

$$Z\mathit{eff} = \mathrm{SQRT}((L1 + L2)/C\mathrm{mod}) \quad (7)$$

and $$V\mathit{eff} = \mathrm{SQRT}(1/(L1+L2)C\mathrm{mod})d. \quad (8)$$

By proper selection of L1 and L2, Zeff may be made equal to the characteristic impedance of the input drive line:

$$Z\mathit{eff} = Z0 \quad (9)$$

Under this condition, a pulse launched down the input transmission line 120 will see the inductors L1 and L2 (130 and 150) and capacitor Cmod (110) as approximating a short segment of a transmission line matched to the characteristic impedance of the input transmission line 120. The pulse will traverse this matched line and then encounter the matched termination Rload, wherein Rload=Z0. Thus, by adding L1 and L2, the disadvantageous shunt Cmod may be changed into something that approximates a desirable matched transmission line. As with any interface having matched characteristic impedance, transmission may be maximized and reflection may be minimized.

Since the arrangement of L1 (130), Cmod (110) and L2 (150) constitute only an approximation to a transmission line, the ideal value for Zeff will only approximate the value Z0, but it is reasonable to expect that it will not vary too far from Z0. Therefore, a desirable value of Zeff would range from about 50% to about 200% of Z0. Within these limits, the exact values of L1 and L2 (130 and 150) for optimum performance may be determined by mathematical modeling or by experimentation.

For a system operating at a high bit rate and, therefore, at a high frequency, it might be difficult to use conventional inductors, that is, coils of wire, for the inductive elements L1 and L2. Specifically, conventional inductors tend to be dominated by complex parasitics at very high frequencies, causing the coiled inductors to operate poorly.

A more desirable way to implement the inductive elements L1 and L2 (130 and 150) is to employ transmission lines that have high values of characteristic impedance "Za" and a propagation velocity "Va". Like any transmission line, such a Za transmission line will have a series inductance per length "L*a" and a shunt capacitance per length "C*a". The series inductance per length L*a will provide the needed inductive elements, and the shunt capacitance per length C*a is an unwanted side effect. Accordingly, the characteristic impedance Za of such a Za transmission line may be given by:

$$Za=\text{SQRT}(L^*a/C^*a). \tag{10}$$

This expression suggests that in an embodiment in which the inductive effect of the Za transmission line is maximized and the capacitive effect is minimized, the characteristic impedance Za may be increased.

Figure 3:
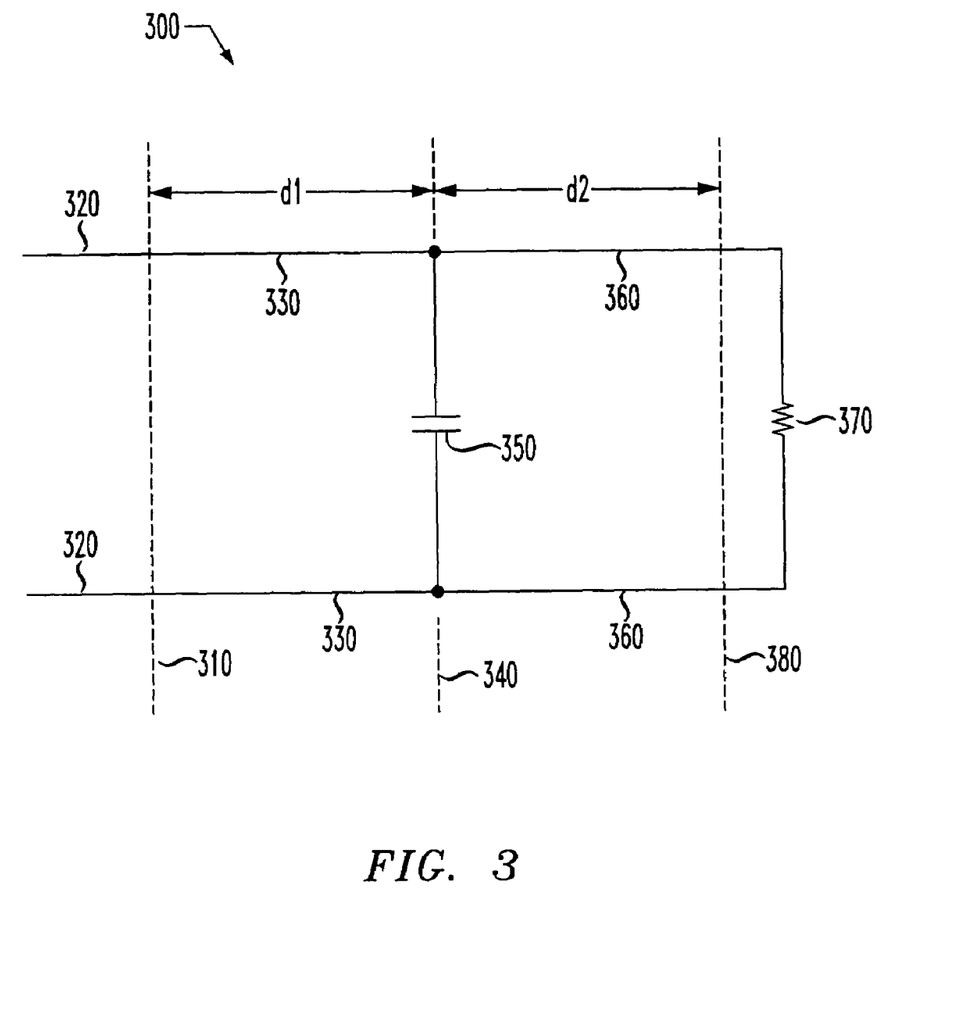
FIG. 3 illustrates an implementation of the electrical circuit shown in FIG. 1 using high characteristic impedance transmission lines ("Za" lines) in a circuit model of one embodiment of a device constructed according to the principles of the present invention.

FIG. 3 shows how the inductors L1 and L2 (130 and 150) illustrated in FIG. 1 may be implemented using a high characteristic impedance transmission line (a "Za" line). Specifically, FIG. 3 illustrates a circuit model 300 of one embodiment of a device constructed according to the principles of the present invention. At a plane 310, an input transmission line 320 (having a characteristic impedance=Z0) connects to a transmission line segment 330 having a length "d1" and a characteristic impedance Za. At a plane 340, the segment 330 connects to a capacitor 350, representing a physical modulator (not shown), and having a capacitance Cmod.

A transmission line segment 360 having a length "d2" and a characteristic impedance Za connects the modulator/capacitor 350 to a load resistor 370 having a resistance equal to Z0. The load resistor 370 is opposite a plane 380 from the line segment 360 and the modulator/capacitor 350. It is desirable to implement the elements extending from the plane 310 to the plane 380 such that they approximate a transmission line having a characteristic impedance Z0. The input transmission line 320, the elements from the plane 310 to the plane 380, and the load resistor 370 will, thereby, all having matching characteristic impedances.

In examining the elements extending from the plane 310 to the plane 380, including the Za line first segment 330, the modulator/capacitor 350, and the second Za line segment 360, but not the load resistor 370, the total series inductance from the plane 310 to the plane 380 will be L*a (d1+d2). The total capacitance from the plane 310 to the plane 380 will be given by the sum of the distributed capacitance of Za and the lumped capacitance of the modulator: C*a (d1+d2)+Cmod. If the distance (d1+d2) is sufficiently short, the sequence of elements, both distributed and lumped, extending from the plane 310 to the plane 380 will act as components having continuous, distributed properties. Under this condition, the elements from the plane 310 to the plane 380 will act as a segment of transmission line. Since this line is made up of both distributed and lumped elements, it may be termed a "composite" line. The inductance per length and the capacitance per length for the composite transmission line may be determined by dividing the total inductance and capacitance values above by the length (d1+d2):

$$L^*\text{comp}=L^*a(d1+d2)/(d1+d2)=L^*a \tag{11}$$

and $$C^*\text{comp}=C^*a+(C\text{mod}/(d1+d2)). \tag{12}$$

The characteristic impedance Zcomp and propagation velocity Vcomp for the composite line are:

$$Z\text{comp}=\text{SQRT}(L^*\text{comp}/C^*\text{comp}) \tag{13}$$

and $$V\text{comp}=\text{SQRT}(1/(L^*\text{comp}\ C^*\text{comp})). \tag{14}$$

Zcomp and Vcomp may be derived in terms of a loading factor "K":

$$Z\text{comp}=Za/K \tag{15}$$

and $$V\text{comp}=Va/K \tag{16}$$

where $$K=\text{SQRT}(1+C\text{mod}/(C^*a(d1+d2))). \tag{17}$$

Note that because Cmod, C*a, d1 and d2 are all positive, the loading factor K should be greater than 1. Accordingly, the effect of Cmod is to "load down" the Za line, reducing both its characteristic impedance and propagation velocity. If Cmod=0 (that is, if the modulator/capacitor 350 was removed), then K=1 and the composite line will have the same properties as the Za transmission line.

In order to make the plane 310 to the plane 380 section of FIG. 3 match the input line impedance Z0, we need:

$$Z\text{comp}=Z0 \tag{18}$$

This condition may be achieved by designing the Za line so that:

$$Za=Z0(K). \tag{19}$$

Whatever value K might have, it will almost always be greater than 1, so that a first condition on Za will be:

$$Za>Z0. \tag{20}$$

A second, more restrictive condition on Za would be to set it exactly to Z0 (K). In view of the above calculations based on approximation, it is expected that Za will have advantageous values in a range around Z0 (K). A reasonable range for the second, more restrictive condition on Za would be:

$$(\tfrac{1}{2})(Z0)(K)<Za<2(Z0)(K). \tag{21}$$

As discussed above, the distance (d1+d2) may be sufficiently small in an advantageous embodiment. Using the expression for the propagation velocity for the composite line Vcomp, a sufficiently small distance (d1+d2) may be clarified. The shortest wavelength "WLmin" seen propagating along the composite depends on the maximum frequency "fmax" of the input signal and on Vcomp, and may be expressed as:

$$WL\text{min}=V\text{comp}/f\text{max}. \tag{22}$$

Accordingly, WLmin may set the size scale for the composite line. The distance (d1+d2) will be sufficiently small if it is small with respect to WLmin. This condition may be reasonably met if:

$$(d1+d2) \leq (1/4)WL\text{min}. \tag{23}$$

In one exemplary embodiment of the invention, WLmin ranges from about 2 mm to about 15 mm. Accordingly, in view of equation (23) above, the distance (d1+d2) may have a value that is less than about 4 mm. While one specific example for value of (d1+d2) has been given, those skilled in the art understand that such values should be optimized according to a known value for WLmin.

It follows from the discussion above that a transmission line can be designed to exhibit the desired matched load situation over a broad range of operating frequencies despite the inclusion of a modulator and its inherent capacitance Cmod. Accordingly, one embodiment of such a transmission line according to the principles of the present invention may include a plurality of interconnecting transmission line segments, such as segments 330 and 360 in FIG. 3, that each have an inherent inductance that provide a predetermined characteristic impedance when combined with the capacitance Cmod of the modulator (350). Preferably, the predetermined characteristic impedance substantially matches the characteristic impedance of the remainder of the transmission line and its elements. Accordingly, over a broad range of frequencies, the impedance of the entire transmission line including the modulator will match the characteristic impedance of the input transmission line. This matched impedance substantially decreases or eliminates reflection back onto the input transmission line and improves the signal entering the modulator. Accordingly, high frequency performance of the modulator may be improved, and a higher bit rate may be achieved.

Figure 4:
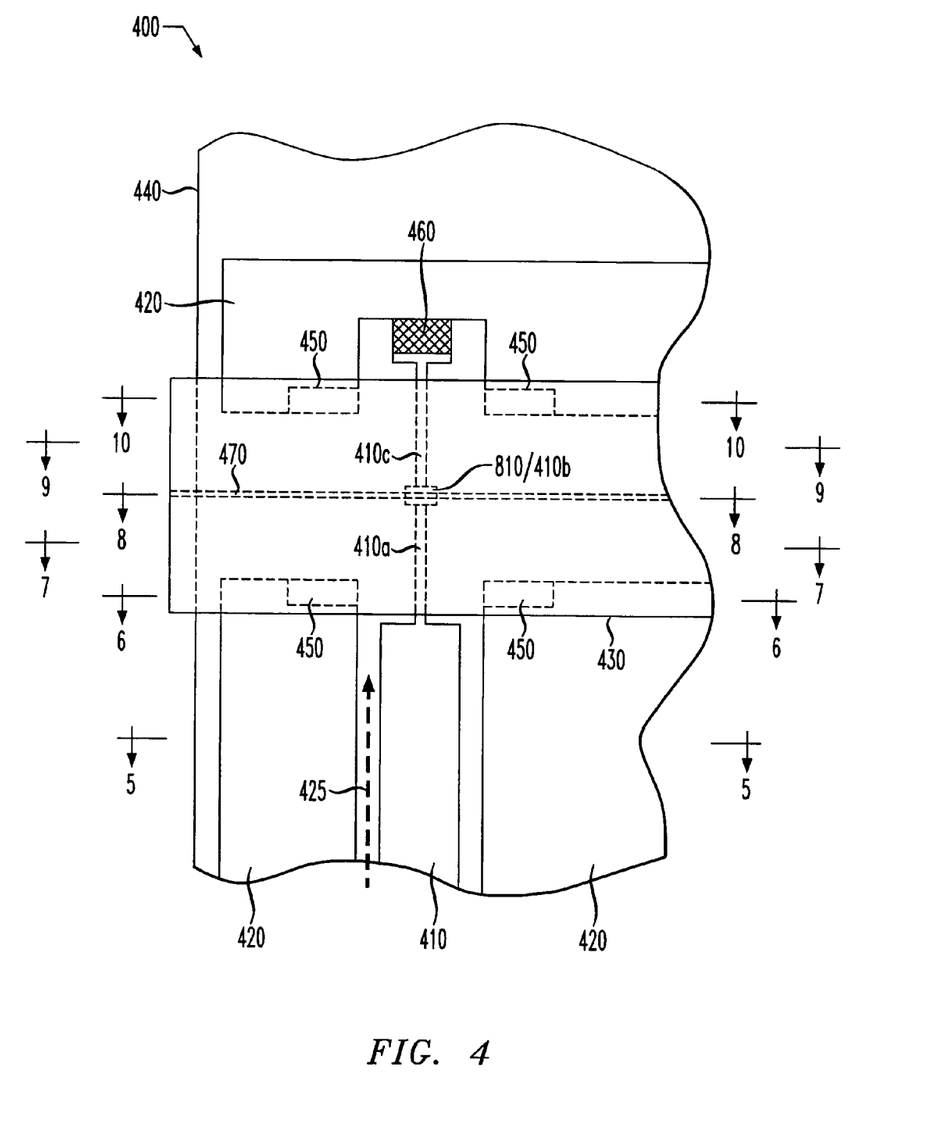
FIG. 4 illustrates a plan view of one physical implementation of a Za transmission line in one embodiment of an optoelectronic device constructed according to the principles of the present invention.

Turning now to FIG. 4, illustrated is a plan view of an embodiment of an optoelectronic device 400 in accordance with the principles of the present invention, which takes advantage of the above discussion regarding FIGS. 1–3. Specifically, FIG. 4 illustrates a plan view of one embodiment of a physical implementation of a Za transmission line in an optoelectronic device 400. The optoelectronic device 400 includes a submount 440 and an optical substrate 430 coupled to the submount 440. In the following discussion, the optical substrate 430 may be a modulator chip 430. However, those skilled in the art will readily recognize that the optical substrate 430 may be an optical device other than a modulator. Also, an optical waveguide 470 may be included in the optical substrate 430.

The submount 440 includes a ground conductor 420 and a signal conductor 410. In one embodiment, the submount 440 may be a plate of ceramic or other material upon which metal features may provide electrical connection to the optical substrate 430, as well as provide other auxiliary functions.

In general, transmission lines are formed by two conductors. It is conventional to call one of these conductors a signal conductor and the other a ground conductor. However, those having skill in the art understand that such signal and ground conductors are not necessarily traditional signal and ground connections. Generally, a ground conductor is physically larger than a signal conductor, and may also be called a ground plane, a ground trace or just a ground. In some instances the ground plane may be made up of more than one piece of conductive material, with the pieces collectively serving as a single ground conductor. Similarly, the signal conductor may also be called a signal trace. Generally speaking, higher values of characteristic impedance Za may be readily obtained by moving at least a substantial portion of the signal and/or ground conductors of the transmission line off of the modulator chip or optical substrate 430 entirely, and placing it on the submount 440, as illustrated in FIG. 4. Additionally, higher values of characteristic impedance Za may be obtained by providing separation between the related transitions of the signal and ground conductors 410, 420 from the submount 440 to the optical substrate 430. This separation is particularly beneficial along a direction of propagation of a signal along the signal and ground conductors 410, 420 (a direction of propagation is denoted by the arrow 425 for the embodiment of FIG. 4), as discussed below.

In the active-down configuration of FIG. 4, the metal features on the submount 440 can be used as signal and ground conductors 410 and 420 of the Za transmission line. In one embodiment, the signal conductor 410 substantially remains as a trace on the submount 440, while the conductive substrate of the optical substrate 430 becomes a substantial portion of the ground conductor 420. An air-gap 405 (see FIG. 6) between the submount 440 and the optical substrate 430 then becomes at least part of the dielectric conventionally found between conductive and modulation regions of an electro-absorption modulator. Electrical connection between the optical substrate 430 and submount 440 may be established, for example, by solder pads 450 formed on either the optical substrate 430 or the submount 440.

Figure 5:
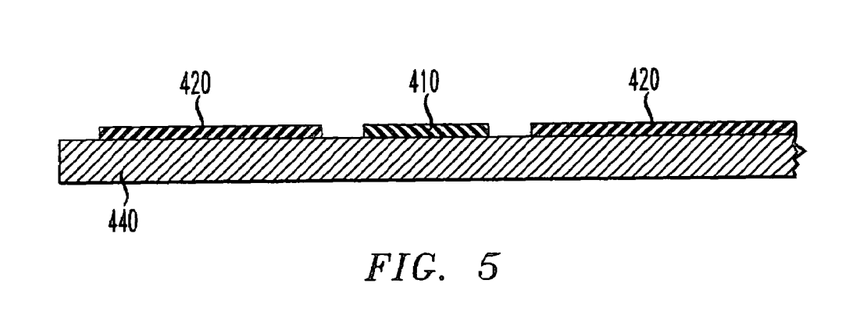
FIGS. 5–10 illustrate successive cross-section views of the optoelectronic device shown in FIG. 4.

FIGS. 5–10 illustrate successive cross-sections through the optoelectronic device 400 shown in FIG. 4, in an attempt to more clearly illustrate that which is shown in the plan view of FIG. 4. Referring to FIGS. 4 and 5, collectively, an input transmission line having a characteristic impedance Z0 drives the optical substrate 430 and is initially formed by the signal conductor 410 and the ground conductor 420. This style of transmission line shown is known as "coplanar waveguide," and it consists of the center signal conductor 410 flanked by the two ground conductors 420 that serve as a single ground plane. It is important to note that the term "coplanar waveguide" is a conventional term known by those skilled in the art. It is fundamentally no different from any other transmission line and it should not be confused with the optical waveguide 470 of the optical substrate 430. In addition, while those having skill in the art may understand that a coplanar waveguide includes both signal and ground traces, the signal and ground traces may be referred to herein as signal and ground conductors forming an input transmission line. In one embodiment, the portions of the transmission line passing under the optical substrate 430 may be referred to as signal and ground conductors, while the portions of the input transmission line beyond the footprint of the optical substrate 430 may be signal and ground traces. In addition, the transmission line (410/420) may take on forms other than a coplanar waveguide.

Figure 6:
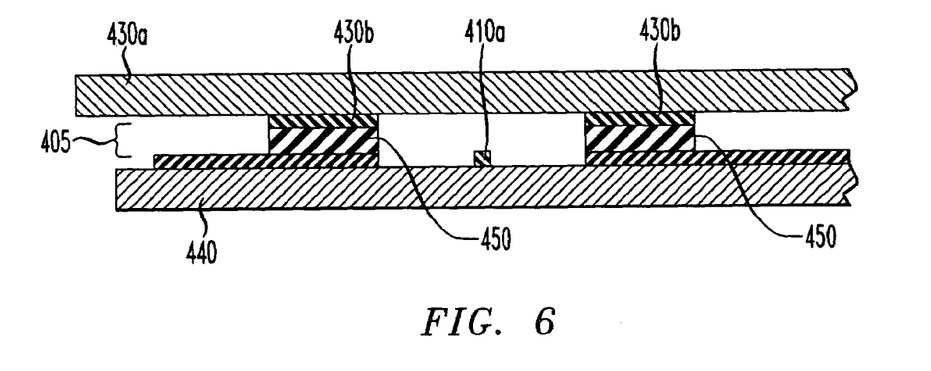

FIG. 6 corresponds to a cross-section taken at the plane 310 shown in FIG. 3. Referring to FIGS. 4 and 6, collectively, the signal conductor 410 of the input transmission line continues under the optical substrate 430, becoming the Za signal conductor 410a. As shown in FIG. 4, the signal conductor 410 may decrease in width as it transforms into the Za signal conductor 410a. The ground conductor 420 of the input line electrically connects to a conductive substrate 430a of the optical substrate 430. To accomplish this transition between the submount 440 and the optical substrate 430, the input ground conductor 420 passes under the optical substrate 430 a short distance and is electrically connected to the conductive substrate 430a via solder pads 450. In one embodiment, the optical substrate 430 may include electrical contacts 430b to facilitate this connection. The contacts 430b may be contact pads, and they may pass through openings in insulating layers (not shown) fabricated on an active region (not shown) of the optical substrate 430, thereby connecting to the conductive substrate 430a of the optical substrate 430. Thus, an input transmission line having characteristic impedance Z0 may transition to a Za transmission line having characteristic impedance Za (see discussion above regarding FIGS. 1–3). The Za transmission line now includes the Za signal conductor 410a and the conductive substrate 430a of the optical substrate 430 (e.g., a Za ground conductor). Note that the related transition of the Za signal conductor 410a has not yet occurred, such that a signal propagating along the signal and ground conductors 410 and 420 will encounter the transition of the ground conductor 420 to the conductive substrate 430a before encountering the related transition of the Za signal conductor 410a to the optical substrate 430 (see FIG. 8). That is, the ground conductor 420 has transitioned to the conductive substrate 430a of the optical substrate 430, but the Za signal conductor 410a remains on the submount 440.

Figure 7:
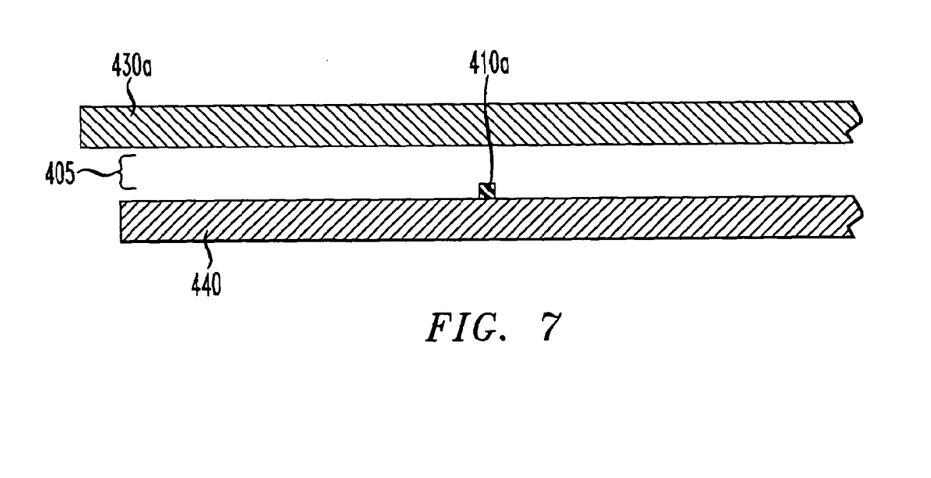

Referring to FIGS. 4 and 7, collectively, the Za transmission line continues past the transition point of the ground conductor 420. The conductive substrate 430a of the optical substrate 430 acts as the ground plane (ground conductor) of the Za transmission line, and the Za signal conductor 410a remains on the submount 440.

Figure 8:
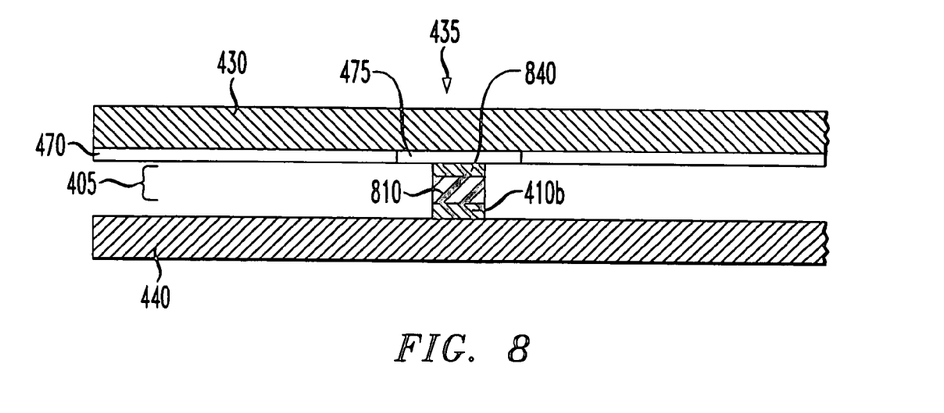

FIG. 8 corresponds to a cross-section taken at the plane 340 shown in FIG. 3. Referring to FIGS. 4 and 8, collectively, the Za transmission line (currently 410a and 430a) extends to a modulation region or other active region 435 of the optical substrate 430, where the Za signal conductor 410a connects to a modulator pad 410b. A solder pad 810, which may be similar to the ground-connection solder pads 450, connects the modulator pad 410b to the active region 435 of the optical substrate 430. Thus, the Za signal conductor 410a may transition from the submount 440 to the optical substrate 430 via the modulator pad 410b and the solder pad 810. Moreover, this transition is separated from the related transition of the ground conductor 420 to the conductive substrate 430a (see FIG. 6). In addition, as will be discussed below, this separation is along an associated direction of propagation.

The active region 435 may include the optical waveguide 470, and may also include an electrode 840 coupled between the solder pad 810 and the optical waveguide 470. The active region 435 may also include a modulation region 475, which may be a portion of the optical waveguide 470, and which may comprise a composition different than the remainder of the optical waveguide 470. The modulation region 475 may also be a discrete portion of waveguide material coupled to the optical waveguide 470. However, in some embodiments, the modulation region 475 may merely be the portion of the optical waveguide 470 adjacent the active region 435, and having the same composition as the remainder of the optical waveguide 470.

In one embodiment, the Za signal conductor 410a may transition between the submount 440 and the optical substrate 430 adjacent the modulation region 475 of the optical waveguide 470. As used herein, the term adjacent is intended to include directly thereunder, partially thereunder, or offset by a minute distance. However, in other embodiments, this transition between the submount 440 and the optical substrate 430 may not occur adjacent the modulation region 475, as discussed below.

Figure 9:
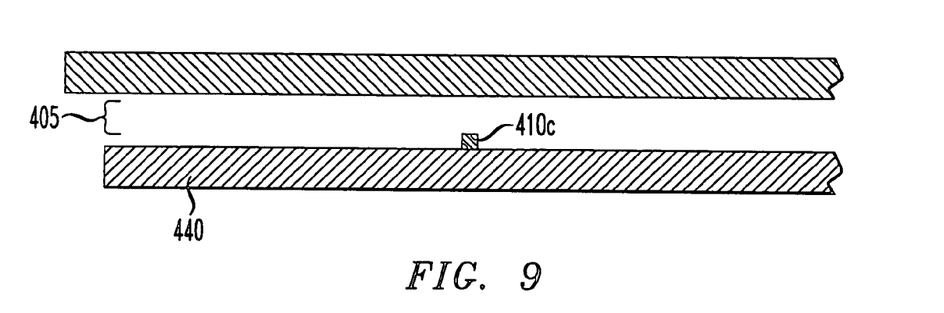

Referring to FIGS. 4 and 9, collectively, a second section 410c of Za signal conductor extends away from the modulator pad 410b to the edge of the optical substrate 430 after the signal conductor of the Za transmission line (410a–c) transitions back to the submount 440. While this transition is shown in FIGS. 4 and 8 to occur adjacent the first transition and the modulation region 475, it may occur at other locations, including near an edge of the optical substrate 430, as discussed below. The conductive substrate 430a of the optical substrate 430 remains the ground plane (ground conductor) of the Za transmission line.

Figure 10:
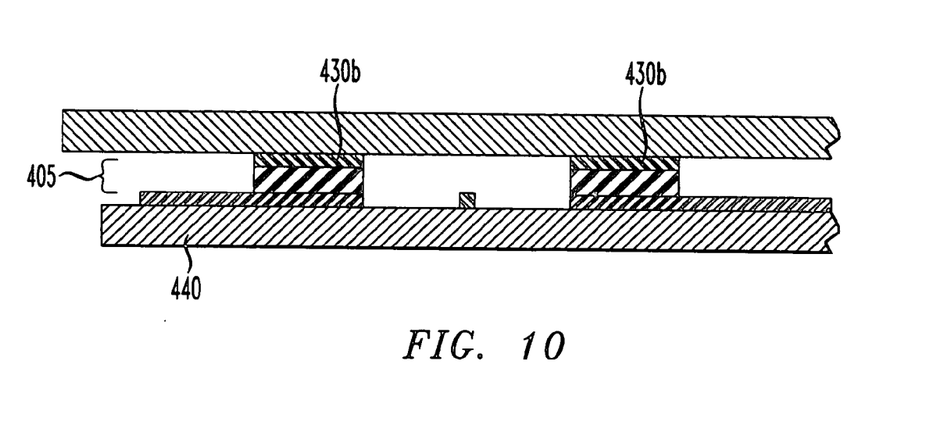

FIG. 10 corresponds to a cross-section taken at the plane 380 shown in FIG. 3. Referring to FIGS. 4 and 10, collectively, the ground conductor (currently 430a) of the Za transmission line transitions from the conductive substrate 430a of the optical substrate 430 back to the ground plane 420 on the submount 440. With both ground and signal conductors 410 and 420 back on the submount 440, they may be connected to opposing ends of a load resistor 460 located on the submount 440. The load resistor 460 may be a thin film resistor. In one embodiment, the ground and signal conductors 410 and 420 may be connected to a resonator (see resonator 1115 in FIG. 11), rather than the load resistor 460.

The thickness of the solder pads 450 and 810 determines the spacing between the Za signal conductor (410a, 410b and 410c) and the Za ground conductor (430a) for the Za transmission line. The solder pads 450 and 810 may be quite thick, especially in embodiments in which the solder pads 450 and 810 are patterned on the submount 440, where the requirements for photolithography are not as stringent as on the optical substrate 430. Other spacing means are also possible, such as pads or columns located away from the optical substrate 430 (not shown). The combination of wide spacing and the low dielectric constant (~1.0) of the air dielectric make high values of Za much easier to achieve. The air gap 405 between the Za signal conductor (410a–c) and the Za ground conductor (430a) may range from about 1 μm to about 30 μm, and preferably ranges from about 5 μm to about 15 μm. In one embodiment, another material having a dielectric constant less than or equal to about 4.0, including an inert gas and silicon dioxide, may occupy the gap 405. The gap 405 may also be sealed, and the resulting void may be pumped down to a substantial vacuum.

In FIGS. 4–10, the transition of the Z0 input transmission line to the Za transmission line, as well as the transition from the Za transmission line to the load resistor 460, are depicted as being located near the edges of the optical substrate 430. Such a location is not essential. While not depicted as such, this first transition may occur anywhere between the edge of the optical substrate 430 and the modulator pad 410b, or even outside the edges of the optical substrate 430. The second transition may occur outside of the edge of the optical substrate 430, but may also occur within the edges of the optical substrate 430, as shown in FIG. 4. Generally, moving these transitions closer to the optical waveguide 470 on the optical substrate 430 will reduce d1 (see FIG. 3) and moving them away from the optical waveguide 470 will increase d1. The detailed design, in any case, creates a transition from a drive impedance Z0 to a higher impedance Za connecting to the optical substrate 430. Similar liberties may be taken at the transition to the load resistor 460 in order to vary d2 (see FIG. 3).

Accordingly, higher values of characteristic impedance Za may be obtained by separating the related transitions of the signal and ground conductors 410, 420 between the submount 440 to the optical substrate 430. By separation, it is intended that the transitions are separated along a direction of propagation 425 associated with a signal propagating along the signal and ground conductors 410, 420. Those skilled in the art will recognize that, although the signal propagating along the signal and ground conductors 410, 420 may not be a DC signal, the signal will nonetheless have a general direction of propagation, even if only by schematic convention. Moreover, this separation is a spatial comparison of related transitions. Related transitions are those along which a signal propagates in the same general direction relative to the active region 435. For instance, the optoelectronic device 400 includes first related transitions for signals generally propagating toward the active region 435 (see FIGS. 4 and 8), as well as second related transitions for signals generally propagating away from the active region 435. However, as shown in FIG. 4, the first and second related transitions may be very close to one another. Furthermore, as shown in FIG. 8, the first and second transition of the Za signal conductor 410 (410a–c) may be embodied in a single structural element, such as the solder pad 810 shown in FIG. 4.

The separation between the transitions is set at a predetermined distance. The predetermined distance may define a region comprising signal and ground conductors 410, 420 separated by an air gap 405. Accordingly, the predetermined distance may define a region that acts as an inductive element, such as a distributed inductive element, or that actually forms at least a portion of an inductive element (see previous discussion regarding FIGS. 1–3). In one embodiment, the predetermined distance may range between about 10% and about 100% of a radian of phase of a shortest wavelength (WLmin) that propagates along the signal and ground conductors 410 and 420. In another embodiment, the predetermined distance may range between about 40% and about 90% of a radian of phase of WLmin. In yet another embodiment, the predetermined distance may range between about 60% and about 80% of a radian of phase of WLmin.

As shown in FIG. 4, a separation may also be found between the related transitions of the signal and ground conductors 410, 420 from the optical substrate 430 to the submount 440. However, while it is advantageous for both the related transitions from the submount 440 to the optical substrate 430 to be separated and the related transitions from the optical substrate 430 to the submount 440 to be separated, only one set of related transitions need be separated according to the present invention.

Furthermore, FIGS. 4–10 illustrate an optical substrate 430 that is mounted "active down" on the submount 440. However, those skilled in the art understand that an embodiment in which the optical substrate 430 is mounted "active up" is also within the scope of the present invention.

There are other embodiments by which the Za line of the present invention may be realized. In one embodiment (not shown), a ground conductor of the Za line may substantially remain on a submount, while a signal conductor of the Za line may transition to a conductive layer of a modulator chip or other optical substrate coupled to the submount, such that these two transitions may be separated a predetermined distance along a direction or propagation. In such an embodiment, the ground conductor may comprise a single, conductive sheet on the submount passing under the optical substrate. The Za ground conductor transition may include a bond pad on the optical substrate and adjacent the waveguide. The bond pad may connect to the ground conductor by solder.

Figure 11:
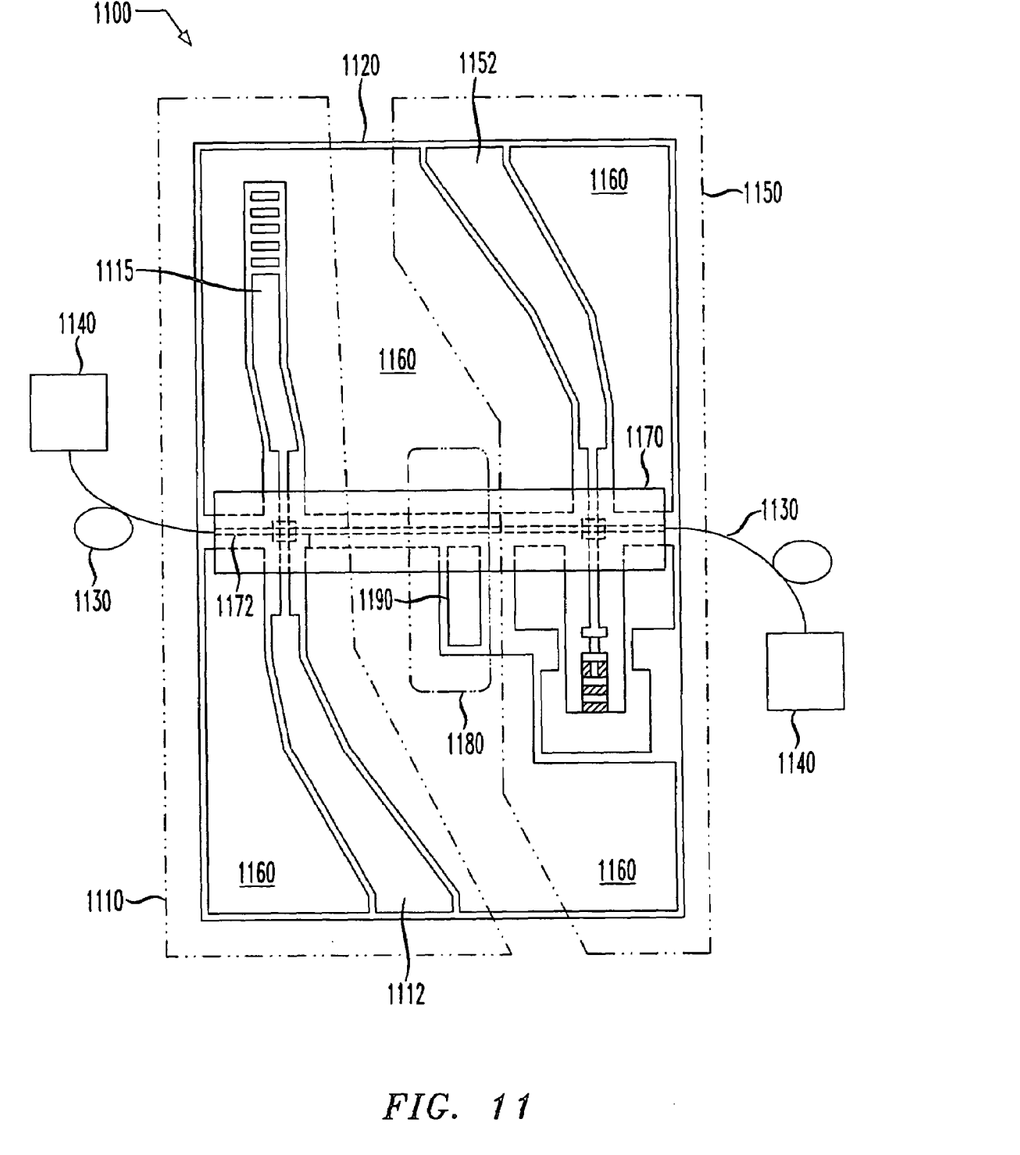
FIG. 11 illustrate a plan view of one embodiment of an optical communications system which may form one environment in which a device similar to the optoelectronic device shown in FIGS. 4–10 may be used.

Turning to FIG. 11, illustrated is a plan view of one embodiment of an optical communications system 1100 which may form one environment in which a device similar to the optoelectronic device 400 may be used. The optical communications system 1100 includes an optoelectronic device 1110, as shown by the dotted lines. The optoelectronic device 1110 may be similar to the optoelectronic device 400. However, as shown in the illustrative embodiment, the optoelectronic device 1110 may include a resonator 1115 in lieu of the load resistor discussed above with reference to FIGS. 4–10. The resonator 1115 may be a conventional resonator, as known to those skilled in the art. The optoelectronic device 1110 may be formed on a common substrate 1120 of the optical communication system 1100. The optical communication system 1100 also includes one or more optical fibers 1130 coupled to the optoelectronic device 1110. The optical communication system 1100 may also include one or more devices 1140 optically coupled to the optoelectronic device 1110. The optical devices 1140 may be selected from the group consisting of lasers, photodetectors, transmitters and receivers. The optical devices 1140 may be coupled to the optoelectronic device 1110 by the optical fibers 1130.

In another embodiment, the optoelectronic device 1110 may be a first optoelectronic device 1110 having first signal and ground conductors 1112 and 1160, and the optical communications system 1100 may include a second optoelectronic device 1150 having second signal and ground conductors 1152 and 1160, as shown by the dotted lines. The second optoelectronic device 1150 may be similar to the optoelectronic device 400 and/or the optoelectronic device 1110. As shown in the illustrative embodiment, the first and second optoelectronic devices 1110 and 1150 may share a common ground plane 1160. The first and second optoelectronic devices 1110 and 1150 may also share a common optical substrate 1170, which may be a modulator or other optical device, or a portion thereof. The first and second optoelectronic devices 1110 and 1150 may also share a common optical waveguide 1172. The first optoelectronic device 1110 may be a carver device, and the second optoelectronic device 1150 may be a coder device. Carver and cover devices are known to those skilled in the art.

As shown in the illustrative embodiment, the optical communication system 1100 may also include an amplifier portion 1180. The amplifier portion 1180 may include a biasing electrode 1190 formed on the substrate 1120 and electrically coupled to the modulator chip 1170. The amplifier portion 1180 may amplify a signal propagating through the optical waveguide 1172.

The present invention therefore provides an optoelectronic device, a method of manufacturing the device and a system employing the same, wherein the optoelectronic device includes an optical substrate, coupled to a submount and including an optical device, and a signal and a ground conductor coupled to the submount, wherein the signal and ground conductors have a direction of signal propagation associated therewith, and wherein related transitions of the signal and ground conductors between the submount and the optical substrate are separated along the direction by a predetermined distance. In this manner, at least one of the signal or ground conductors of the transmission line remains substantially on the submount rather than traveling along a substantial portion of the optical substrate. Higher values of characteristic impedance Za may thus be readily obtained. The combination of the wide spacing of the modulator and submount, and the low dielectric constant of the air dielectric in the gap therebetween, makes the high values of characteristic impedance Za much easier to achieve. Accordingly, the characteristic impedance of the different sections of the transmission line may be more closely matched despite the parasitic capacitance of the modulator chip.

Although the present invention has been described in detail, those skilled in the art should understand that they can make various changes, substitutions and alterations herein without departing from the spirit and scope of the present invention.

What is claimed is:

1. An optoelectronic device, comprising:
   an optical substrate coupled to a submount and including an optical device; and
   a signal and a ground conductor coupled to said submount,
   wherein said signal and ground conductors have a direction of signal propagation associated therewith, and wherein related transitions of said signal and ground conductors between said submount and said optical substrate are separated along said direction by a predetermined distance, wherein said predetermined distance is based on a shortest wavelength (WLmin) that propagates along said signal and ground conductors.

2. The optoelectronic device as recited in claim 1 wherein said related transitions are transitions of said signal and ground conductors from said submount to said optical substrate.

3. The optoelectronic device as recited in claim 1 wherein said predetermined distance is between about 10% and about 100% of a radian of phase of said shortest wavelength (WLmin) of said signal that propagates along said signal and ground conductors.

4. The optoelectronic device as recited in claim 1 wherein said optical device includes an optical waveguide having a modulation region, and wherein one of said transitions is adjacent said modulation region.

5. The optoelectronic device as recited in claim 1 wherein said related transitions are first transitions, and further including second related transitions of said signal and ground conductors between said submount and said optical substrate, wherein said second transitions are separated along said direction.

6. The optoelectronic device as recited in claim 1 wherein said optical device is a modulator.

7. The optoelectronic device as recited in claim 1 further including a coplanar waveguide and a load resistor, said coplanar waveguide located on said submount and including a signal trace and a ground trace respectively contacting said signal and ground conductors, said load resistor coupled to said signal conductor at an end opposite from said signal trace, wherein a distance (d1+d2) between said signal trace and said load resistor is less than or equal to the shortest wavelength (WLmin) that propagates along said signal and ground conductors.

8. The optoelectronic device as recited in claim 1 wherein said predetermined distance defines a region that is at least a portion of an inductive element.

9. The optoelectronic device as recited in claim 1 wherein said submount and said optical substrate are separated by a gap ranging between about 1 μm and about 30 μm, wherein a material having a dielectric constant less than about 4.0 occupies said gap.

10. The optoelectronic device as recited in claim 1 wherein said optoelectronic device is included within an optical communications system including a transmitter or a receiver.

* * * * *